United States Patent
Wachter et al.

[11] 3,746,408
[45] July 17, 1973

[54] STAMPED BEARING ASSEMBLY

[75] Inventors: Vincent C. Wachter, Milford; Joseph R. Keller, Fairfield; Frederick J. Feldmann, Stratford, all of Conn.

[73] Assignee: MPB Corporation, Keene, N.H.

[22] Filed: July 21, 1971

[21] Appl. No.: 164,508

[52] U.S. Cl. ................................................ 308/72
[51] Int. Cl. ............................................ F16e 23/00
[58] Field of Search ........................................ 308/72

[56] References Cited
UNITED STATES PATENTS
3,438,661   4/1969   Bowan III .......................... 387/88
3,614,182   10/1971   Rozentals .......................... 308/72

FOREIGN PATENTS OR APPLICATIONS
99,240   12/1959   Denmark ............................ 287/88

*Primary Examiner*—Charles J. Myhre
*Assistant Examiner*—Frank Susko
*Attorney*—Dean S. Edmonds, Harry C. Jones, III et al.

[57] ABSTRACT

A stamped bearing assembly consisting of two sheet metal housing halves crimped together and having a pocket for receiving a bearing member. The housing halves are dimensioned to provide a minimum size with maximum strength. The housing includes a head portion in which the ball is received within a pocket and a shank portion having a bore for receiving a shank member or for use in attachment to a connecting member not formed as part of the assembly. An internal channel connects the pocket with the bore. The construction of the channel both strengthens the housing and provides a passage for lubricating or injecting plastic race material into the pocket. The shank member is permanently attached to the shank portion of the housing by deformation of the shank portion of the housing against the shank member.

22 Claims, 10 Drawing Figures

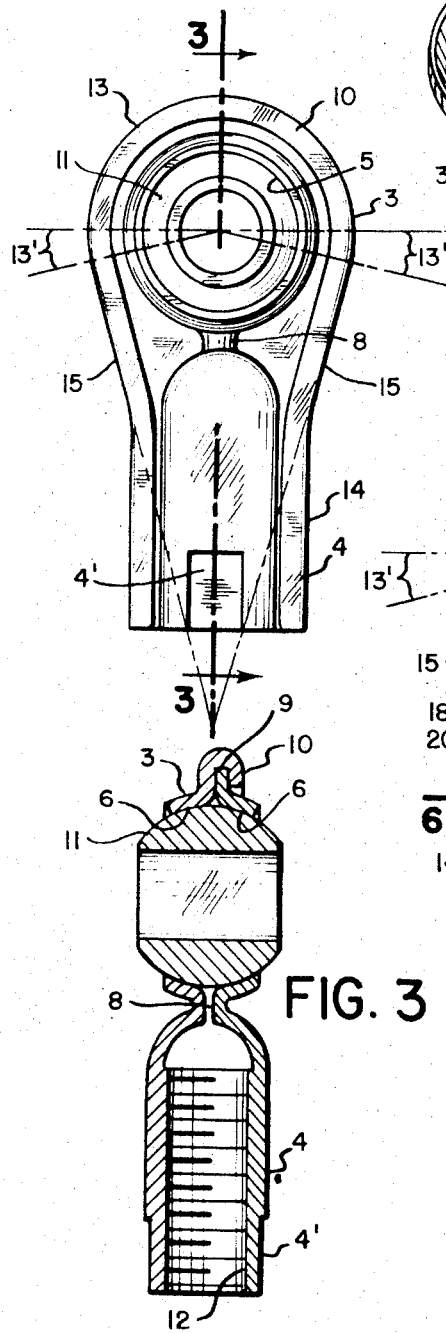

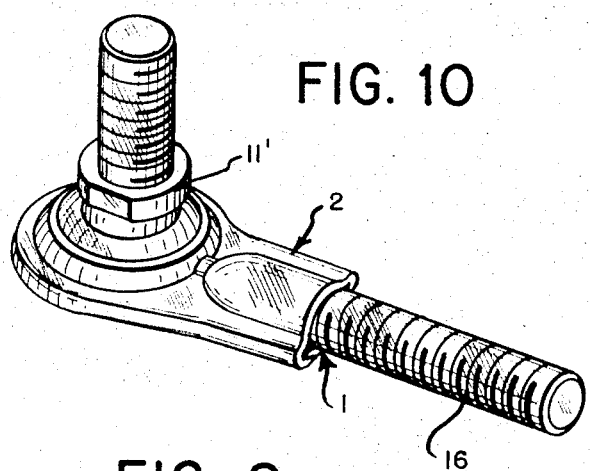
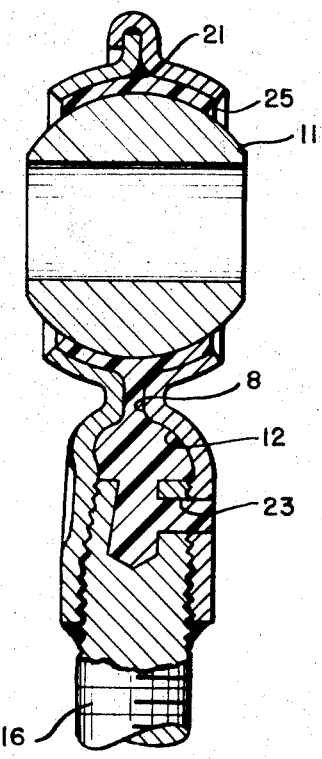
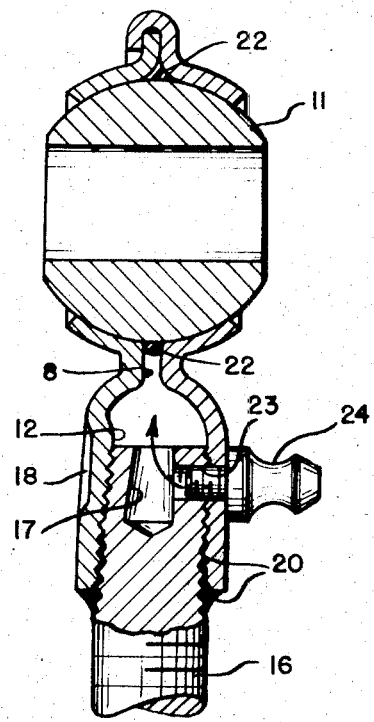
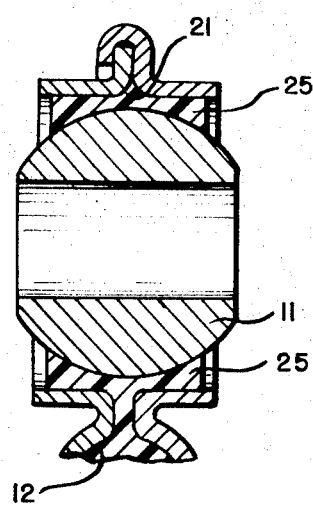
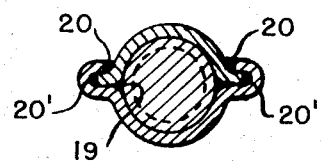

STAMPED BEARING ASSEMBLY

BACKGROUND OF THE INVENTION

Spherical bearing assemblies including rod end assemblies are today constructed in a number of different ways. For example, the housing for the assembly may be made of sheet metal and stamped into a shape to provide both a bearing surface for a spherical ball member and a shank portion for mounting the assembly in the apparatus with which it is to be used. Typically, the housing is comprised of two stamped halves secured together either by spot welding or by crimping the edge of one half over the edge of the other. Also, the spherical ball may be secured for rotation in direct bearing contact with the stamped housing structure or a packing or race material may be provided for supporting the ball in the housing. Constructions of the type discussed above are disclosed, for example, in U. S. Pat. No. 1,898,100 and Danish Pat. No. 99,240 (1964). Stamped rod end bearing assemblies are also presently available commercially. In construction, the housing is made of two halves stamped to provide a spherical bearing surface for directly supporting a spherical metal ball and a tubular shank portion for receiving a shank member. For securing the housing halves together, the periphery of one is crimped about the periphery of the other.

It is also old to construct spherical rod end bearing assemblies from a single blank of material. Here, the housing is either machined from a block of metal or made for a metal blank by a drawing and shaping operation. Bearing assemblies of these types are disclosed in U. S. Pats. Nos. 3,287,071 and 3,438,661.

Generally, the prior art bearing assemblies are either expensive to manufacture, possess limited strength characteristics or have sacrificed quality for reduced cost. Also, with the bearing assemblies made of stamped housing parts, the overall size of the housing is generally made large to compensate for reduced strength. This provides a bulky unattractive appearing assembly. Further, with the stamped bearing assemblies presently available, the connection of the shank member can be less than satisfactory when the assembly is subjected to severe loading conditions including conditions which result in misalignment or improper loading. Under such situations, the rod end member may become loose within the shank portion of the housing and may even loosen the connection of the housing halves.

SUMMARY OF THE INVENTION

In accordance with the teachings of the present invention, a stamped bearing assembly of superior quality and one having superior operating performance characteristics is provided. The assembly is constructed of two stamped sheet metal halves that are shaped to provide a minimum overall dimension with maximum strength. In addition, the stamped contour of the housing not only provides strength but is constructed to provide a passageway for lubrication of the ball held within the housing. Alternatively, this passageway can be used for injecting plastic where the assembly is to include a plastic race material between the inner ball and housing structure.

The present construction is made so that it may be supplied either as a female assembly having a threaded bore or as a male assembly having a threaded shank member permanently threaded into a shank portion formed in the housing. Where the latter construction is desired, the shank member is secured within the shank by deformation and brazing to provide a high strength connection.

BRIEF DESCRIPTION OF THE DRAWINGS

FIG. 1 is a perspective view of the housing parts of the bearing assembly of the present invention;

FIG. 2 is a plan view of the female bearing assembly of the present invention;

FIG. 3 is a view taken along lines 3—3 of FIG. 2;

FIG. 4 is a plan view of the male bearing assembly of the present invention;

FIG. 5 is a cross-sectional view taken along lines 5—5 of FIG. 4;

FIG. 6 is a cross-sectional view taken along lines 6—6 of FIG. 5;

FIG. 7 is a partial cross-sectional view showing the construction of a lubricating orifice;

FIG. 8 is a partial cross-sectional view of an alternative embodiment of the present invention;

FIG. 9 is a cross-sectional view of still another embodiment of the present invention; and FIG. 10 is a perspective view of another type of bearing assembly incorporating the features of the present invention.

DETAILED DESCRIPTION OF THE PREFERRED EMBODIMENTS

As shown in FIG. 1, the housing of the bearing assembly of the present invention is constructed of two sheet metal halves 1 and 2 made, for example, from low carbon steel. Advantageously, the housing halves are cadmium or zinc plated. Materials other than low carbon steel may be used to suit the particular conditions under which the assembly is to be used. The housing halves are formed from sheet metal by a stamping operation and each half includes a head portion 3 and shank portion 4. The head portions have aligned circular openings 5 forming spherically contoured surfaces 6. The stamping operation also forms the bore sections 7 in the shank portion of the housing halves and a connecting channel 8 extending between the bore section and the opening in the head portion. As shown in FIG. 1, one of the housing halves is stamped with a flat peripheral edge 9 while the other is shaped with an upturned peripheral flange 10.

In assembling the two housing halves, they are positioned face to face with the half 1 positioned within the half 2 and with a spherical ball bearing member 11 disposed within the aligned openings of the head portions. The ball may be made of case hardened, low carbon steel or other suitable material. The housing halves are secured together by crimping the peripheral flange 10 of the outer half 2 over the peripheral edge 9 of the inner half 1. In assembled condition, the aligned openings 5 define a ball pocket for rotatably holding the spherical ball 11. In addition, the stamped contour of the shank portion of the housing halves defines a bore 12. This bore is provided with internal threading by suitable techniques as, for example, roll forming.

As shown in FIGS. 2 and 3 and FIGS. 4 and 5, the assembly may be made either as a female structure or as a male structure. The female assembly differs from the male assembly in that it has a longer threaded shank portion and flattened wrench surfaces 4' on the shank portion. The male assembly, on the other hand, includes a threaded shank member permanently secured into a shorter shank portion.

In accordance with the teachings of the present invention, the size and contour of the bearing housing is made to produce an assembly of minimum size and maximum strength. As shown in FIGS. 2 and 4, the head portion of the housing is provided with a circular periphery 13 which is concentric to the opening 5 and, as indicated at 13', extends slightly more than 180° in length. The opened ends of the circular periphery face the shank portion of the assembly. The shank portion is provided with straight sides 14 and has a central axis extending radially relative to the opening 5 in the head portion.

The peripheral edges 15 of the housing halves between the circular periphery 13 and the straight sides of the shank portion are such as to eliminate any preferred location of failure in the housing structure through this area and to provide maximum strength for handling any misalignment and improper loading to which the assembly may be subjected. In particular, the peripheral edges 15 extend at an acute angle of about 30° to the central axis of the shank portion. This angle is large enough to provide the necessary strength for support and prevention of tension distortion of the housing. Advantageously, the peripheral edges 15 define straight edges extending from the straight sides of the shank portion and merging tangentially with the circular periphery of the head portion at the open ends thereof.

The assembly is further strengthened by having the straight sides of the shank portion extend for at least a distance about equal to the diameter of the bore 12 therein. Also, the threaded surface of the bore extends beyond the straight sides of the shank portion so that either the connecting member for the female assembly or the shank member shown in FIGS. 4 and 5 may be threaded into the shank portion by a distance greater than the diameter of the bore.

In order to provide an assembly with a minimum outer dimension, the peripheral edge 9 of the head portion of the inner housing half 1 extends radially beyond the outwardly protruding section 6' forming the pocket by a minimum distance. This distance is dependent on the material from which the housing is made and its thickness, and is just sufficient to permit crimping of the peripheral flange 10 of the outer housing half 2 without causing fracturing or failure of the metal. Also, the peripheral flange 10 is sized so that it is a minimum dimension which upon crimping, will lie closely adjacent the protruding section 6'. The closely crimped surfaces provide good support and prevent the pocket bearing surfaces from being forced open under load.

With the circular periphery 13' of the housing extending slightly more than 180° around the ball pocket, the assembly of the parts is facilitated and added strength is provided. More particularly, the housing half 1 can be inserted into the housing half 2 and will be properly held in alignment during the crimping operation. Also, with this construction, the ball pocket is fully reinforced to preclude distortion during loading of the assembly. The crimped edge provides this reinforcement; and even if the assembly is placed under loading conditions which tend to force the ball toward the shank portion, the crimped circular periphery in the area 13' will provide the necessary reinforcement precluding distortion of the pocket or separation of the housing halves in this area.

In accordance with the teachings of the present invention, the shank member 16 in the male assembly is secured within the shank portion of the housing to provide maximum strength. As shown in FIGS. 4 and 5, the shank member 16 is provided with a bore 17 extending axially in from each end of the member to form hollow ends. The diameter and depth of the bore are each about one-half the diameter of the member. One of the hollow ends of the member is threaded into the bore of the shank portion of the housing.

Once the hollow end of the shank member is threaded into place as shown in FIG. 5, the shank portion of the housing is struck to cause inward deformation as shown at 18. This inward deformation of the housing, in turn, causes inward deformation of the end of the shank member; and the hollow construction permits such deformation so that the member becomes mechanically locked against rotation in the shank portion of the housing.

To assure a rigid connection, the shank member is threaded into the shank portion of the housing for a distance at least equal to the diameter of the shank member. Also, the shank member extends into the shank portion for a distance about twice the depth of the bore 17 in the hollow end. This limits deformation to a location spaced inwardly from the point at which the shank member extends out from the shank portion.

To further increase the strength of the connection of the shank member, it is brazed to the shank portion of the housing. The brazing solder is shown in the drawings at 20. Also, as shown in FIGS. 4 and 5, the brazing is effected completely around the shank member where it extends from the housing and also into the threaded connection between the shank member and housing. The brazed solder, which may for example be silver solder, flows by capillary action into the threaded joint. Also, as shown in FIG. 6 the bore in the shank portion of the housing is not perfectly circular and provides slight openings 19 at the point of joining of the housing halves for flow of the brazing solder.

In addition to brazing the shank member to the housing, the peripheral edges of the housing halves along the shank portion are brazed together at the crimped connection. This increases the strength of this connection particularly where the crimped flange 10 leaves a slight spacing 20' between it and the edges 9 of the inner housing half. By brazing both the shank member to the shank portion of the housing and the crimped edges of the housing together, the two housing halves and shank member are effectively integrally joined to produce a high strength connection.

With the female assembly shown in FIGS. 2 and 3, the attachment to a suitable connecting member in the structure with which the assembly is used may be made simply by threading. Alternatively, the connection may be made in the same way as with the threaded shank member. In either case, the connecting member becomes a shank member for the assembly.

As stated above, the housing of the bearing assembly of the present invention is provided with a channel 8 connecting the ball pocket with the bore in the shank portion. This channel is stamped into the housing halves and provides a raised rib on the opposite sides of the housing. These ribs add strength to the housing section in this area to resist bending distortions. In addition, the channel provides a passageway between the pocket and the bore through which a lubricant may be supplied. If the bearing assembly is to be of the lubricated type, the natural groove 21 formed between the housing halves may be used as a lubricant reservoir. Alternatively, as shown in FIG. 7, a ring of lubricating material 22 may be located in this groove.

For purposes of supplying lubricant, an orifice 23 shown in FIG. 7 is provided. This orifice extends through the shank portion and into the bore 12. Advantageously, the orifice is aligned to communicate with the hollow end of the shank member. A grease fitting 24 may be attached to the orifice to facilitate injection of lubricant. The orifice is necessary for lubricating the male assembly. However, with the female assembly lubrication may be accomplished through the bore of the shank portion.

As an alternative embodiment of the present invention, the ball pocket may be provided with a plastic race material for rotatably supporting the spherical ball member 11. FIGS. 8 and 9 show constructions of this type where the plastic race material is designated by references numeral 25.

Where the plastic race is provided, the housing halves may be formed either as shown in FIG. 8 with the head portion of the housing having the same spherical seating contour as used in the constructions of FIGS. 1–6 or as shown in FIG. 9 with a straight opening for receiving the ball 11. In either case, the plastic race material is molded around the ball by injection through the orifice 23 and/or bore 12 and the channel 8. The plastic race material may be molded around the ball in the manner disclosed in U. S. Pat. No. 3,287,071.

The molded race material of the assemblies shown in FIGS. 8 and 9 will rotatably support the ball and be held in the housing against both rotational and axial movement. Such securing of the race material is effected due to the plastic flowing into the circumferential groove 21. Also, the plastic material will fill the channel 8 and the upper portion of the bore 12 in the shank portion of the housing. This plastic material will also fill the hollow end of the shank member to further enhance its connection to the shank portion of the housing.

FIG. 10 shows the invention as incorporated in a bearing assembly having a studded ball 11' as a bearing member disposed within the pocket of the assembly. Ball joints and studded rod end assemblies as well as other types of bearing assemblies may readily be constructed with the features of the present invention.

We claim:

1. In a bearing assembly having first and second stamped metal housing halves secured together with each half having a head portion and a shank portion, said head portions having aligned circular openings therein to define a ball pocket for receiving a bearing member and said halves being secured together with the peripheral edge of one crimped about the peripheral edge of the other, the improvement wherein:
   a. the head portion has a circular periphery concentric to said openings and extending slightly more than 180°;
   b. the shank portion has straight sides with the central axis thereof extending radially relative to said circular openings;
   c. the periphery of the housing between the sides of the shank portion and the circular periphery of the head portion merges tangentially with said circular periphery and extends at an acute angle to the central axis of the shank portion which is sufficiently large to eliminate any preferred location of failure in the housing between the sides of the shank portion and the circular periphery of the head portion during misalignment or improper loading of the assembly.

2. The improvement in a bearing assembly according to claim 1 wherein:
   a. the acute angle is about 30°.

3. The improvement in a bearing assembly according to claim 2 wherein:
   a. said shank portion has a bore therein for receiving a shank member; and
   b. the straight sided shank portion extends at least for a distance about equal to the diameter of said bore.

4. The improvement in a bearing assembly according to claim 3 wherein:
   a. the housing halves are secured together in face-to-face relation; and
   b. said ball pocket and bore are connected together by an internal channel.

5. The improvement in a bearing assembly according to claim 4 wherein:
   a. said channel is stamped into the housing halves and defines a raised rib on opposite sides thereof.

6. The improvement in a bearing assembly according to claim 4 wherein:
   a. said opening in each half of the housing defines a spherically contoured bearing surface for said bearing member protruding outwardly from opposite sides of said housing;
   b. the circular peripheral edge of the head portion of said other of the housing halves extends radially from the protruding section by a distance just sufficient to permit crimping of said one half thereover.

7. The improvement in a bearing assembly according to claim 6 wherein:
   a. the bore of the shank portion is provided with a threaded surface.

8. The improvement in a bearing assembly according to claim 7 wherein:
   a. a shank member is threadably secured within the bore of said shank portion and extends therein for a distance at least equal to the diameter of said rod.

9. In a bearing assembly having a housing with a head portion holding a ball rotatably secured therein and a shank portion with a shank member secured therein, the improvement wherein:
   a. said shank member has a hollow end secured within said shank portion;
   b. said shank portion is deformed inwardly against said hollow end; and
   c. said hollow end is deformed inwardly at the location of deformation of the shank portion.

10. The improvement in a bearing assembly according to claim 9 wherein:
    a. said shank portion and hollow end are deformed around less than the circumference of said shank portion.

11. The improvement in a bearing assembly according to claim 9 wherein:
    a. said shank member is threadedly received within said shank portion.

12. The improvement in a bearing assembly according to claim 11 wherein:

a. said shank member extends into said shank portion a distance greater than the length of the hollow end thereof by a predetermined ratio.

13. The improvement in a bearing assembly according to claim 12 wherein:
    a. said predetermined ratio is about 2 to 1.
14. The improvement in a bearing assembly according to claim 13 wherein:
    a. the diameter and depth of the bore forming the hollow end are each about one-half the diameter of the shank member.
15. The improvement in a bearing assembly according to claim 9 wherein:
    a. said shank member is brazed in the bore of said shank portion.
16. The improvement in a bearing assembly according to claim 15 wherein:
    a. said shank member is threadedly received within said shank portion; and
    b. said shank member is brazed along its thread in the threaded bore of said shank portion.
17. The improvement in a bearing assembly according to claim 16 wherein:
    a. said housing includes two sheet metal halves with the peripheral edge of one crimped about the peripheral edge of the other along said shank portion; and
    b. the peripheral edges of said housing halves are brazed together along the crimped connection of the shank portion.
18. In a bearing assembly having a housing defining a head portion and a shank portion, said head portion having an opening therein to define a ball pocket for receiving a ball and said shank portion having a bore therein for receiving a shank member, the improvement wherein:
    a. said housing includes an internal channel connecting said pocket to said bore; and
    b. the housing is comprised of two sheet metal halves having the pocket, bore and channel stamped therein with the remainder secured together in face to face relation.
19. The improvement in a bearing assembly according to claim 18 wherein:
    a. said shank portion includes an orifice extending into the bore thereof and through which lubricant may be supplied, via said channel, to said pocket.
20. The improvement in a bearing assembly according to claim 19 wherein:
    a. molded plastic race material supports said ball within said pocket and extends through said channel and into said bore.
21. The improvement in a bearing assembly according to claim 20 wherein:
    a. a hollow ended shank member is secured within the bore of said shank portion; and
    b. said plastic material fills said hollow end.
22. The improvement in a bearing assembly according to claim 21 wherein:
    a. a filling orifice extends through said shank portion and into the hollow end of said shank member.

* * * * *